US011117653B2

(12) United States Patent
Covington et al.

(10) Patent No.: US 11,117,653 B2
(45) Date of Patent: Sep. 14, 2021

(54) SYSTEM AND METHOD FOR TACTILE CUEING THROUGH ROTORCRAFT PILOT CONTROLS USING VARIABLE FRICTION AND FORCE GRADIENT

(71) Applicant: Textron Innovations Inc., Providence, RI (US)

(72) Inventors: Charles Eric Covington, Colleyville, TX (US); Bradley Don Linton, Mansfield, TX (US); Thomas Earl Johnson, Jr., Dallas, TX (US); Luke Dafydd Gillett, Grapevine, TX (US); Robert Earl Worsham, II, Weatherford, TX (US); Jillian Samantha Alfred, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 418 days.

(21) Appl. No.: 15/983,752

(22) Filed: May 18, 2018

(65) Prior Publication Data

US 2019/0161180 A1 May 30, 2019

Related U.S. Application Data

(60) Provisional application No. 62/591,287, filed on Nov. 28, 2017.

(51) Int. Cl.
*B64C 27/56* (2006.01)
*G05G 5/03* (2008.04)
(Continued)

(52) U.S. Cl.
CPC .............. *B64C 27/56* (2013.01); *B64C 27/57* (2013.01); *B64C 27/68* (2013.01); *G05G 5/03* (2013.01)

(58) Field of Classification Search
CPC ..... B64C 13/345; B64C 13/46; B64C 13/507; B64C 27/56; B64C 27/68; B64C 27/57; G05G 5/03
(Continued)

(56) References Cited

U.S. PATENT DOCUMENTS 4,195,802 A * 4/1980 Gilson .................... B64C 27/56
244/17.13
4,696,445 A * 9/1987 Wright ................ B64C 13/0421
244/229
(Continued)

FOREIGN PATENT DOCUMENTS

EP 2311729 A1 4/2011
EP 3069990 A1 9/2016

*Primary Examiner* — Brady W Frazier
(74) *Attorney, Agent, or Firm* — Slater Matsil, LLP

(57) ABSTRACT

An rotorcraft including a pilot control, a pilot control position sensor connected to the pilot control and operable to generate a position signal indicating a position of the pilot control, a flight control computer (FCC) in signal communication with the pilot control position sensor and operable to provide a tactile cue in the pilot control in response to the position signal indicating the position of the pilot control exceeds a threshold associated with an operating limit, and further operable to determine a tactile cueing value for the tactile cue according to a relationship between the position of the pilot control and the threshold, and generate a cue control signal according to the tactile cueing value, and a tactile cue element connected to the pilot control and in signal communication with the FCC and operable to control action of the pilot control in response to the cue control signal.

17 Claims, 9 Drawing Sheets

(51) Int. Cl.
*B64C 27/68* (2006.01)
*B64C 27/57* (2006.01)

(58) Field of Classification Search
USPC .......................................................... 244/223
See application file for complete search history.

(56) References Cited

U.S. PATENT DOCUMENTS

| | | | | |
|---|---|---|---|---|
| 5,156,363 | A * | 10/1992 | Cizewski | ................ B64C 27/56 |
| | | | | 244/223 |
| 6,679,458 | B2 * | 1/2004 | Einthoven | ............... B64C 13/10 |
| | | | | 244/223 |
| 6,695,264 | B2 * | 2/2004 | Schaeffer | ............ B64C 29/0033 |
| | | | | 244/223 |
| 10,474,237 | B2 * | 11/2019 | Gush | ....................... G06F 3/016 |
| 2004/0010354 | A1 | 1/2004 | Nicholas et al. | |
| 2005/0080495 | A1 | 4/2005 | Tesssier et al. | |
| 2005/0151672 | A1 * | 7/2005 | Augustin | .............. B64C 13/345 |
| | | | | 340/965 |
| 2008/0234881 | A1 * | 9/2008 | Cherepinsky | ........ G05D 1/0858 |
| | | | | 701/7 |
| 2009/0234518 | A1 * | 9/2009 | Irwin, III | .............. B64C 13/345 |
| | | | | 701/4 |
| 2009/0266940 | A1 * | 10/2009 | Miller | ................... B64C 13/345 |
| | | | | 244/223 |
| 2012/0072056 | A1 * | 3/2012 | Hasan | ................... B64C 13/507 |
| | | | | 701/3 |
| 2012/0205494 | A1 * | 8/2012 | Taylor | .................... B64C 13/10 |
| | | | | 244/223 |
| 2015/0344128 | A1 | 12/2015 | Sandri | |
| 2016/0304190 | A1 * | 10/2016 | Grohmann | ............. B64C 13/08 |

\* cited by examiner

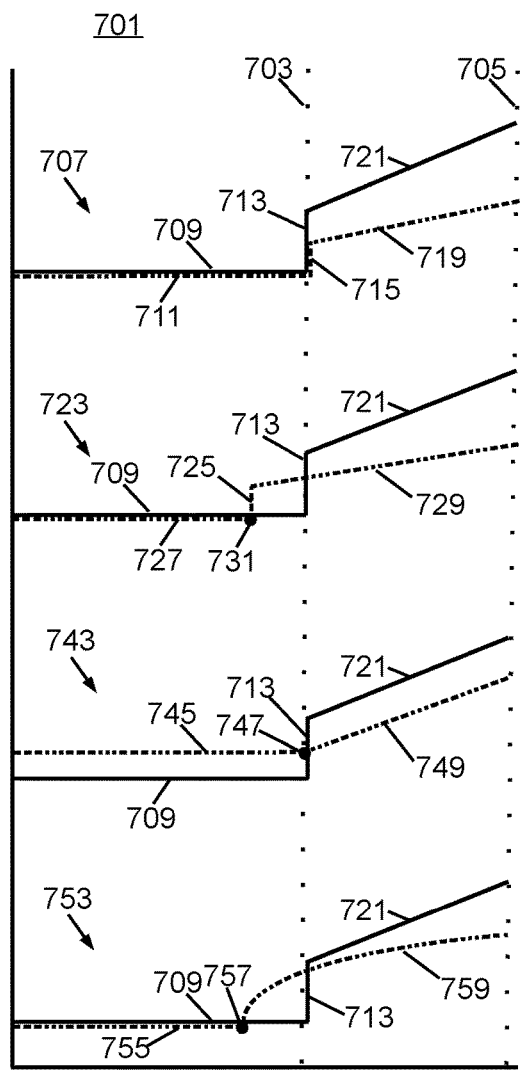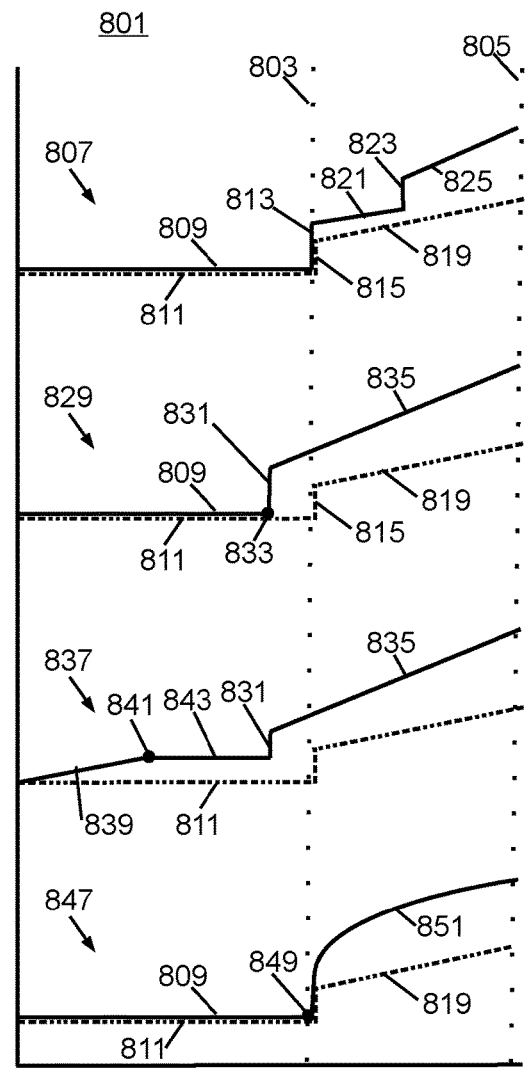
Fig. 7
Fig. 8

… (1/2)

SYSTEM AND METHOD FOR TACTILE CUEING THROUGH ROTORCRAFT PILOT CONTROLS USING VARIABLE FRICTION AND FORCE GRADIENT

This application claims the benefit of U.S. Provisional Application No. 62/591,287, filed on Nov. 28, 2017, which application is hereby incorporated by reference.

TECHNICAL FIELD

The present invention relates generally to a system and method for automated flight control in a rotorcraft, and, in particular embodiments, to a system and method for providing, in the rotorcraft, variable friction and force gradient tactile cues through a pilot control.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotorcraft includes a pilot control, a pilot control position sensor connected to the pilot control, wherein pilot control position sensor is operable to generate a position signal indicating a position of the pilot control, a flight control computer (FCC) in signal communication with the pilot control position sensor and operable to provide a tactile cue in the pilot control in response to the position signal indicating the position of the pilot control has exceeded a threshold associated with an operating limit, where the FCC is further operable to determine a tactile cueing value for the tactile cue according to a relationship between the position of the pilot control and the threshold, and generate a cue control signal according to the tactile cueing value, and a tactile cue element connected to the pilot control and in signal communication with the FCC, where the tactile cue element is operable to control action of the pilot control in response to the cue control signal.

An embodiment flight control computer (FCC) for a rotorcraft includes a processor and a non-transitory computer-readable storage medium storing a program to be executed by the processor. The program includes instructions for providing a tactile cue, and the instructions for providing the tactile cue include instructions for receiving a position signal indicating a position of a collective control of the rotorcraft, determining one or more cue limits according to one or more operating limits of the rotorcraft, determining to apply the tactile cue according to a relationship between the one or more cue limits and the position of the collective control, and controlling action of the collective control in response to determining to apply the tactile cue and using a magnitude of the tactile cue determined according to the relationship between the one or more cue limits and the position of the collective control.

An embodiment method for operating a rotorcraft includes providing a tactile cue on a collective control of the rotorcraft. Providing the tactile cue on the collective control includes receiving a position signal indicating a position of the collective control, determining one or more cue limits according to one or more operating limits of the rotorcraft, determining to apply the tactile cue according to a relationship between the one or more cue limits and the position of the collective control, determining one or more tactile cue values for the tactile cue in response to determining to apply the tactile cue and according to the relationship between the one or more cue limits and the position of the collective control, and controlling action of the collective control in response to determining to apply the tactile cue and using the tactile cue values.

BRIEF DESCRIPTION OF THE DRAWINGS

For a more complete understanding of the present invention, and the advantages thereof, reference is now made to the following descriptions taken in conjunction with the accompanying drawings, in which:

FIGS. 7 and 8 are diagrams illustrating various embodiments of variable friction and gradient force profiles for providing tactile cues.

DETAILED DESCRIPTION OF ILLUSTRATIVE EMBODIMENTS

Figure 1:
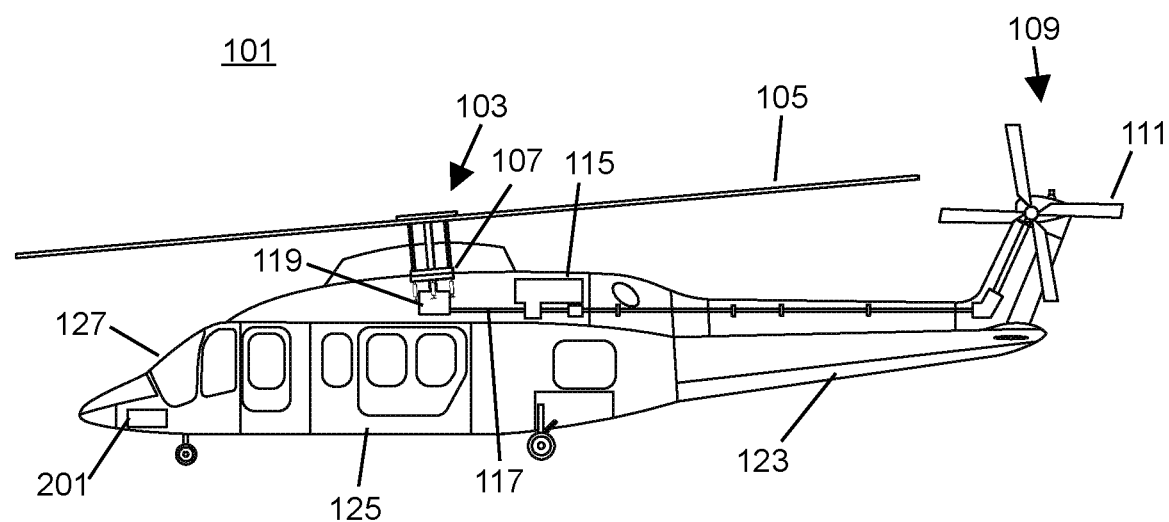
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

FBW systems for rotorcraft must provide stable flight characteristics for FBW controlled flight parameters while permitting the pilot to override or work with any suggested flight parameters suggested by the FBW system. Additionally, in providing enhanced control and automated functionality for rotorcraft flight, the FBW must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system and method described herein are directed to providing variable friction and gradient force tactile cues to a pilot through the pilot controls. In some embodiments, the FBW system measures a position of a pilot control or one or more operating parameters, and provides tactile feedback through one of the pilot controls so that the pilot is alerted to a limit, stop, warning, condition of the rotorcraft, or the like. The use of a tactile cue permits the pilot to concentrate on the flight environment without requiring close monitoring of in-cockpit instrumentation. Additionally, tactile cueing permits the FBW system to provide customized feedback and cueing to the pilot while the FBW decouples the pilot controls from the flight control elements.

In some embodiments, the FBW system provides a friction-type tactile cue and a force-type tactile cue through a pilot control such as the collective stick. The friction cue and the force cue may be provided separately or in tandem. In some embodiments, the friction cue is a resistance to movement that mimics friction of a mechanical system while the force cue is a force pushing in a particular direction that mimics a spring force of a mechanical system. Since the FBW system decouples the flight control elements from the pilot controls, the tactile cueing permits the FBW system to provide pilots with the familiar feel of a mechanical system without having the controls connected to the flight control elements. The FBW system controls when, or at what pilot control position, the friction cue engages, and the amount of friction felt by the pilot as the pilot moves the pilot control. Similarly, the FBW system controls when, or at what pilot control position, the force cue engages, and the amount of force driving the pilot control. The friction cue may be applied by an electrical or electromechanical system friction device so that the friction cue may be engaged or disengaged according to commands by the FBW system. The force cue may be applied by, for example, a trim motor, hydraulic system, pneumatic system, or the like, to provide a drive or force in a single direction. The magnitude of the friction or force may be varied according to commands of the FBW system so that FBW system may, for example, increase the friction or force as the pilot control is moved farther past the threshold.

In some embodiments, one or more of the tactile cues are engaged or activated to indicate the state of one or more operating conditions for the rotorcraft. For example, one or more tactile cues may be engaged when a collective stick is moved past an engine or collective setting limit. In such an example, the FBW system continuously monitors the position of the collective stick, compares the position of the collective stick to a threshold associated with an engine limit, and engages the tactile cues when the collective position exceeds the threshold. The force cue may be engaged to drive the pilot control below the threshold, and may be combined with the friction cue to alert the pilot to the threshold. The force cue acts to drive the pilot control outside of the threshold, but can be overridden by the pilot. Thus, the pilot may feel the force cue, but may pull or move the pilot control through the force cue in case, for example, of an emergency or need or extreme rotorcraft performance. The ability to override the tactile cues is provided by the FBW and sensor systems in the rotorcraft. While the FBW system provides a force cue or movement to the pilot controls, the final position of the pilot controls is used to determine the commands to control the rotorcraft. Thus, when the pilot pulls through, or overrides, the tactile cue, positioning sensors determine the position of the stick set by the pilot and not the intended or suggested position to which the FBW system attempted to set the pilot control. Accordingly, the pilot is ultimately in full control of the rotorcraft, while the FBW system provides the ability to maintain the rotorcraft in a stable flight mode when the pilot is "hands off".

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
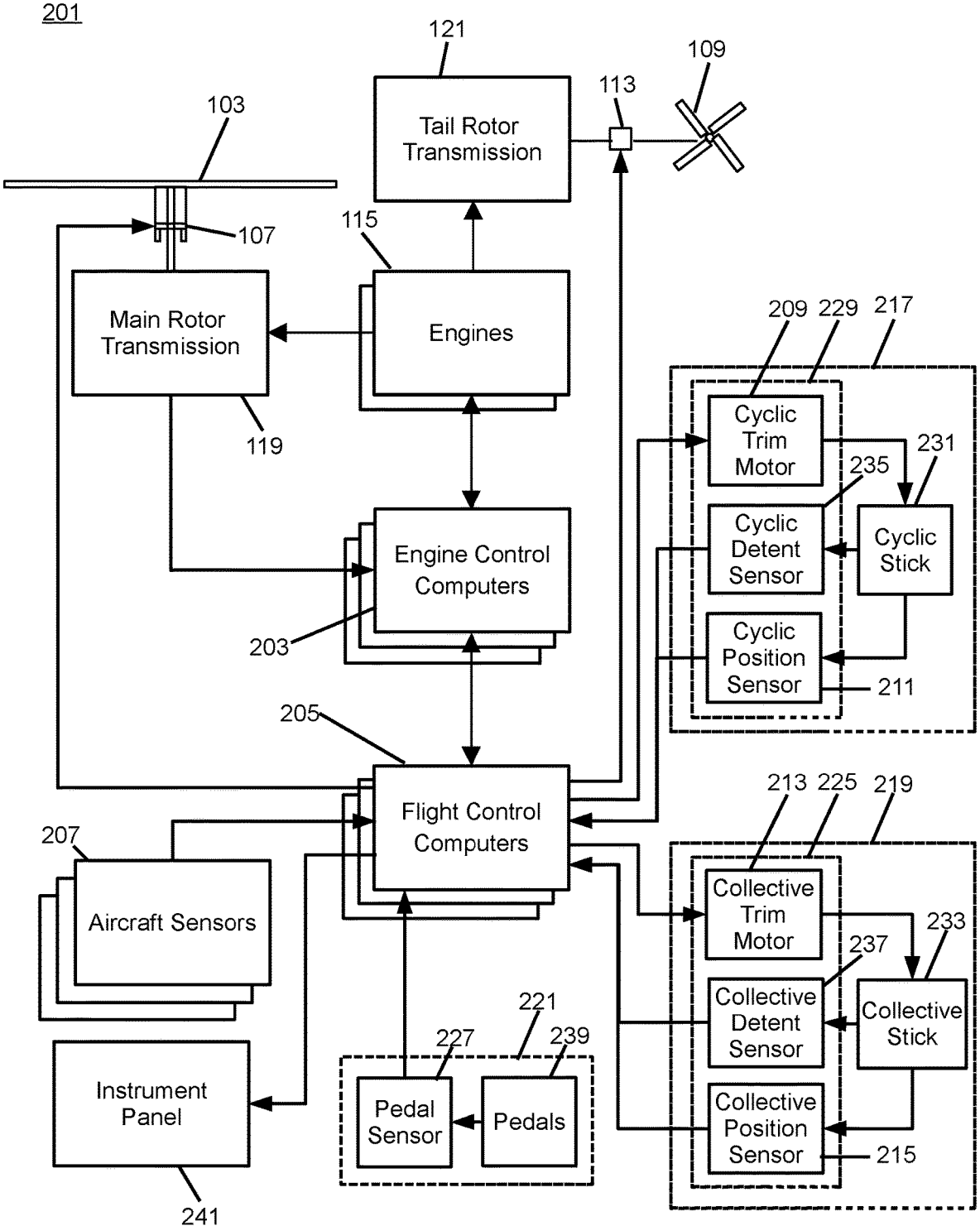
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured RPM of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
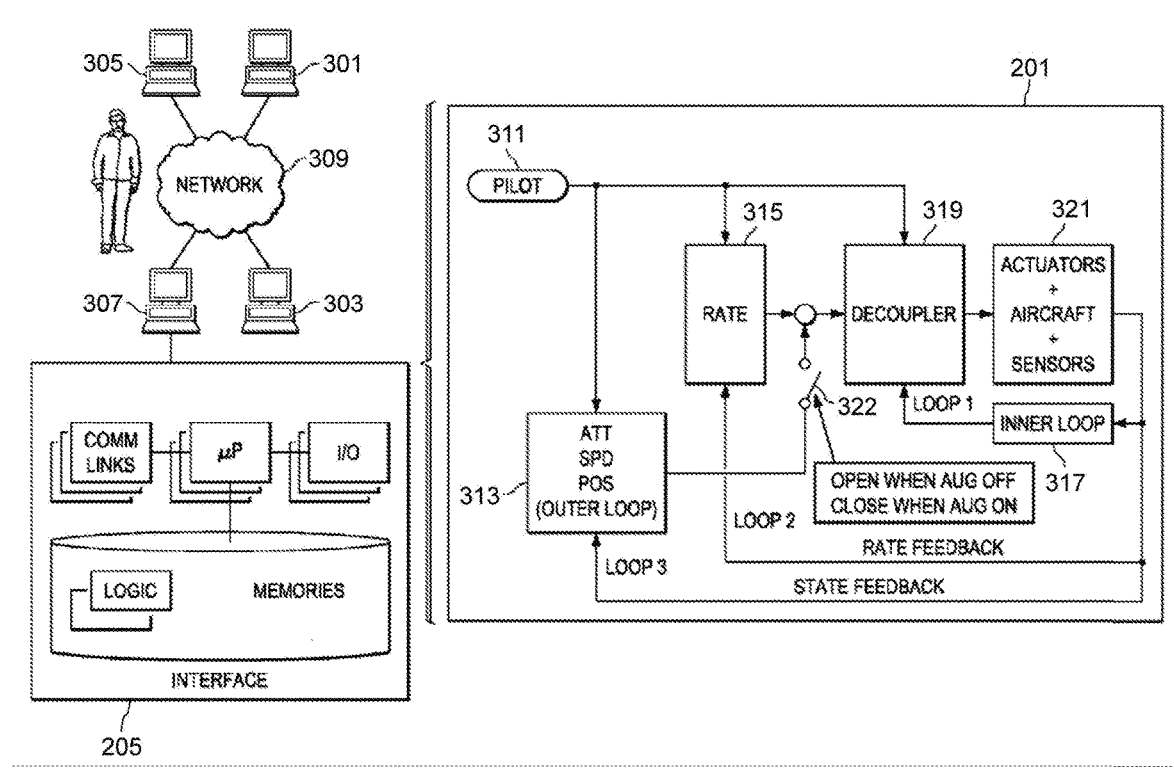
FIG. 3 representatively illustrates a three-loop flight control system 201 according to some embodiments.

Moving now to the operational aspects of flight control system 201, FIG. 3 illustrates in a highly schematic fashion, a manner in which flight control system 210 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop 317 and rate loop 315 may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

In some embodiments, the tactile cueing functions may be implemented in the inner loop 317 as software running on the FCCs 205, and may perform movement or tactile feedback for the pilot controls by activating a state machine that monitors feedback from the rotorcraft sensors, ECCUs and pilot control position sensors and adjusts the position or action of the pilot controls accordingly. The inner loop 317 may receive sensor data from aircraft equipment 321 such as sensors or other instrumentation, and adjust the collective stick position or action in response to, for example, an engine limit or other threshold. Thus, the inner loop 317 may continuously monitor the pilot control positions, engine operating parameters, or other rotorcraft operating parameters and provide one or more tactile cues accordingly. In another embodiment, the outer loop 313 or rate loop 315 may monitor feedback from the ECCUs, collective stick position or feedback from other sensors, determine whether any tactile cues should be applied, and then cause, signal or message the inner loop 317 to set provide the tactile cues.

Figure 4A:
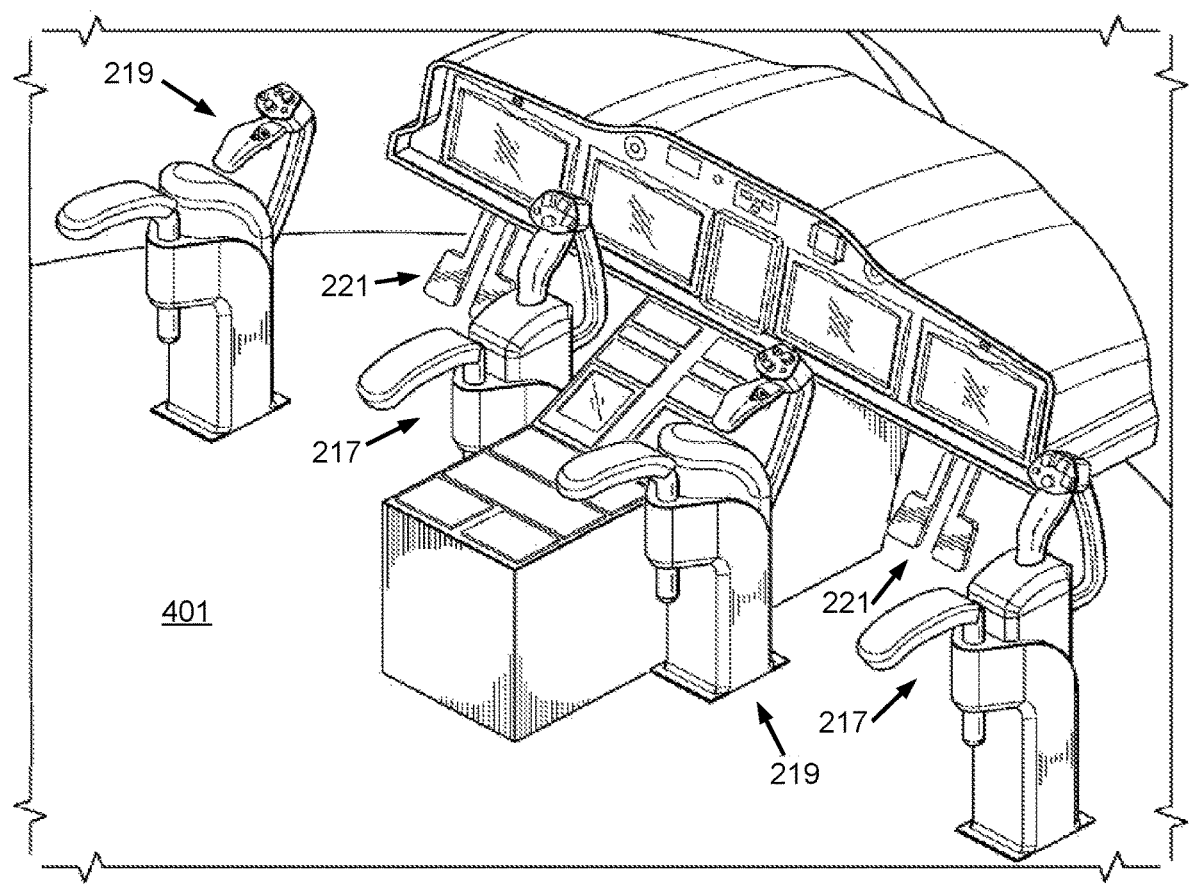
FIG. 4A is a diagram illustrating a cockpit control arrangement according to some embodiments.

FIG. 4A is a diagram illustrating a cockpit control arrangement 421 according to some embodiments. In some embodiments, a rotorcraft has three sets of pilot flight controls in three flight control assemblies that include cyclic control assemblies 217, collective control assemblies 219, and pedal control assemblies 221. A set of each pilot flight control is provided for each pilot (which may include a pilot-in-command and a co-pilot or backup pilot).

In general, cyclic pilot flight controls may allow a pilot to provide cyclic inputs through the cyclic control assembly 217 to set or adjust a cyclic configuration of the main rotor blades, which changes the angle of the individual main rotor blades as the main rotor rotates. This creates variable amounts of lift at varied points in the rotation cycle, causing the rotorcraft to pitch or roll. Collective pilot flight controls may allow a pilot to provide collective inputs through the collective control assembly 219 to set or adjust a collective configuration of the main rotor blades so that the angle of attack for all main rotor blades may be collectively altered by equal amounts and at the same time, resulting in ascent, descent, acceleration, and deceleration. Anti-torque pilot flight controls may allow a pilot to change the amount of anti-torque force applied to the rotorcraft. Tail rotor blades may operate to counter torque created by driving the main rotor. Anti-torque pilot flight controls may allow a pilot to provide pedal inputs through the pedal control assembly 221 and change the amount of anti-torque force applied to change a heading of the rotorcraft. For example, providing anti-torque force greater than the torque created by driving the main rotor may cause the rotorcraft to rotate in a first direction. Similarly, providing anti-torque force less than the torque created by driving the main rotor may cause the rotorcraft to rotate in a second direction opposite the first direction. In some embodiments, anti-torque pilot flight controls may change the amount of anti-torque force applied by changing the pitch of the tail rotor blades, and increasing or reducing thrust produced by tail rotor blades.

Figure 4B:
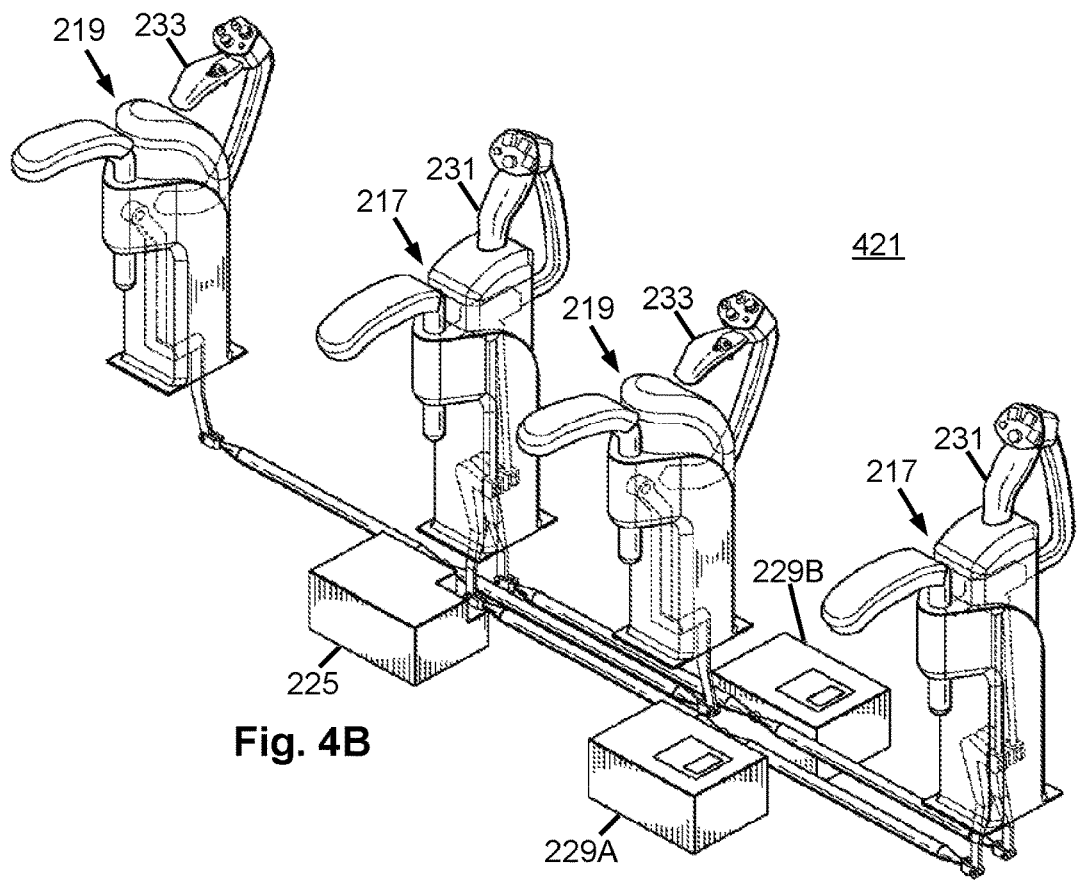
FIG. 4B is a diagram illustrating an arrangement of cyclic and collective control assemblies according to some embodiments.

FIG. 4B is a diagram illustrating an arrangement of cyclic and collective control assemblies 217 and 219 according to some embodiments. In some embodiments, two cyclic control assemblies 217 and two collective control assemblies 219 are provided. The cyclic control assemblies 217 each have a cyclic stick 231 that is coupled to cyclic trim assemblies 229A and 229B. The collective control assemblies 219 each have collective stick 233 that is coupled to a collective trim assembly 225. The trim assemblies 225, 229A and 229B are operable to receive and measure mechanical communications of cyclic and collective inputs from the pilot through the respective sticks 231 and 233. In some embodiments, two cyclic trim assemblies 229A and 229B are provided and are connected to each of the cyclic control assemblies 217. One of the cyclic trim assemblies is a cyclic roll trim assembly 229A that manages roll or left/right cyclic tilting movements, and the other cyclic trim assembly is a cyclic pitch trim assembly 229B that manages pitch or front/back tilting movements. In some embodiments, the trim assemblies 225, 229A and 229B convert mechanical inputs into roll, pitch and collective position signals that are sent to the FCCs. These trim assemblies 225, 229A and 229B may include, among other items, measurement devices for measuring the position of the collective sticks 233 or the different movement axes of the cyclic sticks 231. Trim motors in each of the trim assemblies 225, 229A and 229B may drive or set the positions of the cyclic control assembly 217 or collective control assembly 219.

The cyclic trim assemblies 229A and 229B, and collective trim assembly 225 may be components of a FBW flight control system, and measurements from the cyclic trim assemblies 229A and 229B and collective trim assembly 225 may be sent to a FCC operable to instruct flight control devices to execute commands measured through the trim assemblies 225, 229A and 229B. For example, the FCC may be in communication with actuators or other devices operable to change the position of main rotor blades, and the FCC may generate cyclic control commands and/or collective control commands which are sent to the swashplate actuators or control system to control the angle of the main rotor blades.

Figure 4C:
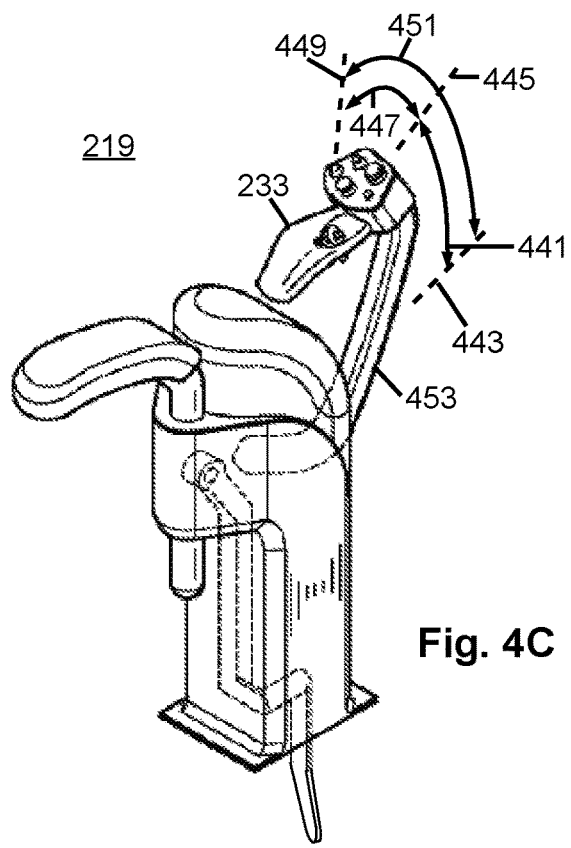
FIG. 4C is a diagram illustrating a collective control assembly and range of motion according to some embodiments.

FIG. 4C is a diagram illustrating a collective control assembly 219 and range of motion according to some embodiments. In some embodiments, the collective stick 233 is mounted on a collective stick support 453, and moves in an arc to indicate the collective position. In the FBW system, the collective stick 233 may be decoupled from the swashplate and engines, so that the range of motion of the collective stick 233 is not limited by the connection to the swashplate or engines. The collective trim assembly 219 may monitor and determine the position of the collective stick 233, and the FCCs may determine a collective setting according to the position of the collective stick 233. In order to maintain the main rotor speed at a substantially constant RPM, the collective setting may be tied to the engine settings so that the engine provides sufficient power to maintain the rotor speed.

The collective stick 233 may have a low position 443 and a high position 445 that are respectively associated with a lowest collective setting and a maximum normal collective setting for the main rotor blades. The low position 443 and high position 445 may define or bound a normal operating range 441. In some embodiments, the normal operating range 441 includes collective settings that correspond to power settings below a threshold such as maximum continuous power. The collective stick 233 may also have a maximum position 449 associated with a collective setting corresponding to the maximum settable power. An overdrive range 447 may be defined or bounded by the maximum position 449 and the high position 445, and may include collective settings corresponding to power setting higher than the normal operating range. In some embodiments, the overdrive range 447 includes the maximum takeoff power, two minute maximum power, and thirty second maximum power settings. The low position 443, high position 445 and maximum position 449 may be stops or positions that are enforced or created by the collective trim assembly using tactile cues.

In some embodiments, the collective trim assembly 219 may provide the tactile cues by driving the collective stick 233 or controlling the action, feel or handling of the collective stick 233 by providing the friction cue in a tactile cue range 451. In some embodiments, the tactile cue range 451 is within the normal operating range 441 and/or the overdrive range 447 and, for movement-type cues such as a force cue, may be in any direction of movement. In some embodiments, the tactile cue range 451 may be limited to the overdrive range 447, the normal operating range 441, or a subset or portion of one or both of the overdrive range 447 and normal operating range 441.

Different tactile cues may be engaged at different collective stick positions. For example, a force cue may be initiated when the collective stick 233 is raised past a threshold associated with an engine limit. The friction cue may be applied in a range just before or below the threshold or engine limit to warn the pilot that the collective stick position is nearing the threshold, and may be continued while the collective tick position remains above the threshold. Thus, the FCCs may engage the friction cue or force cue using a friction cue limit or threshold that is different from a force cue limit or threshold. In some embodiments, the force cue and friction cue is applied to the collective stick based on, for example, performance limits such as engine or power limits, safety procedures such as main rotor RPM overspeed protection or autorotation handling, automated flight processes such as power hold or vertical speed hold, or the like. In some embodiments, the friction cue limit and force cue limit may be variable, with the limits being based on a flight mode, threshold condition, or the like. For example, where the force cue and friction cue are applied to the collective stick based on engine limits, the FCCs may use one or more power settings, such as maximum continuous power, maximum takeoff power, two minute maximum power or another power setting as the threshold for the friction cue and force cue. The collective stick position may trigger the FCC to engage force cues or friction cues based on the limits associated with a particular power setting. Thus, a friction cue may be engaged when the collective stick is moved past a maximum continuous power limit, and a force cue may be engaged in addition to the friction cue when the collective stick is moved further and passes a maximum takeoff power limit. In other embodiments, the overdrive range 447 of the collective stick 223 corresponds to the maximum continuous power, and both the friction cue and force cue are engaged when the collective stick is pulled above the collective stick position associated with the maximum continuous power limit.

The FCCs may maintain the force cue or friction cue on the collective stick 233 while the collective stick remains above the relevant threshold. Thus, the force cue will tend to drive the stick back below the threshold or limit, or outside of a cueing range. The friction cue is a resistance to movement, but does not move the pilot control. The FCCs may terminate driving the collective stick 233 with the force cue or applying the friction cue after the collective stick 233 returns to an acceptable position or range based on the cue limits. Additionally, in some embodiments, the FCCs may apply the force cue as a gradient force, and apply the friction cue as a variable friction cue. Thus, the force cue may be varied according to the collective stick position, a relationship between the collective stick position to the force cue limit, the type or severity of the condition the force cue is related to, or the like. For example, the force cue and the friction cue may be engaged to indicate that the collective stick is past an engine limit, and the force cue may be engaged with an initial force applied at the position corresponding to the engine limit, and the force may be raised as the collective stick moves farther past the engine limit. Thus, the FCCs may determine a magnitude of the tactile cue or tactile cue value to be applied to a pilot control, where the magnitude of the tactile cue or tactile cue value is determined according to a relationship between the pilot control position and the relevant operational limit.

The initial force at the engine limit position may represent a step change, that is, the force of the force cue applied by the trim motor jumps at the engine limit to provide a soft stop indication in the collective stick to the pilot. In some embodiments, the initial force cue has a force of about 1.8 pounds, and, as the collective stick is raised against the force cue, the force is increased by, for example, about 0.3 pounds per inch the collective stick is raised. Thus, the force cue increases as the collective stick is moved past the engine limit. Similarly, the friction cue may variable as well, and may be implemented with a step change in the resistance value when the collective stick 233 is at an engine limit. For example, the initial frictional force provided by the friction cue, that is the force needed to overcome the friction cue, may initially be 0.5 pounds, and may be increased as the collective stick is raised. In some embodiments, the force required to move the collective stick at the maximum position 449 or top of the cueing range may be, for example, 8 pounds, and includes the force needed to overcome the force cue and the friction cue.

Figure 5:
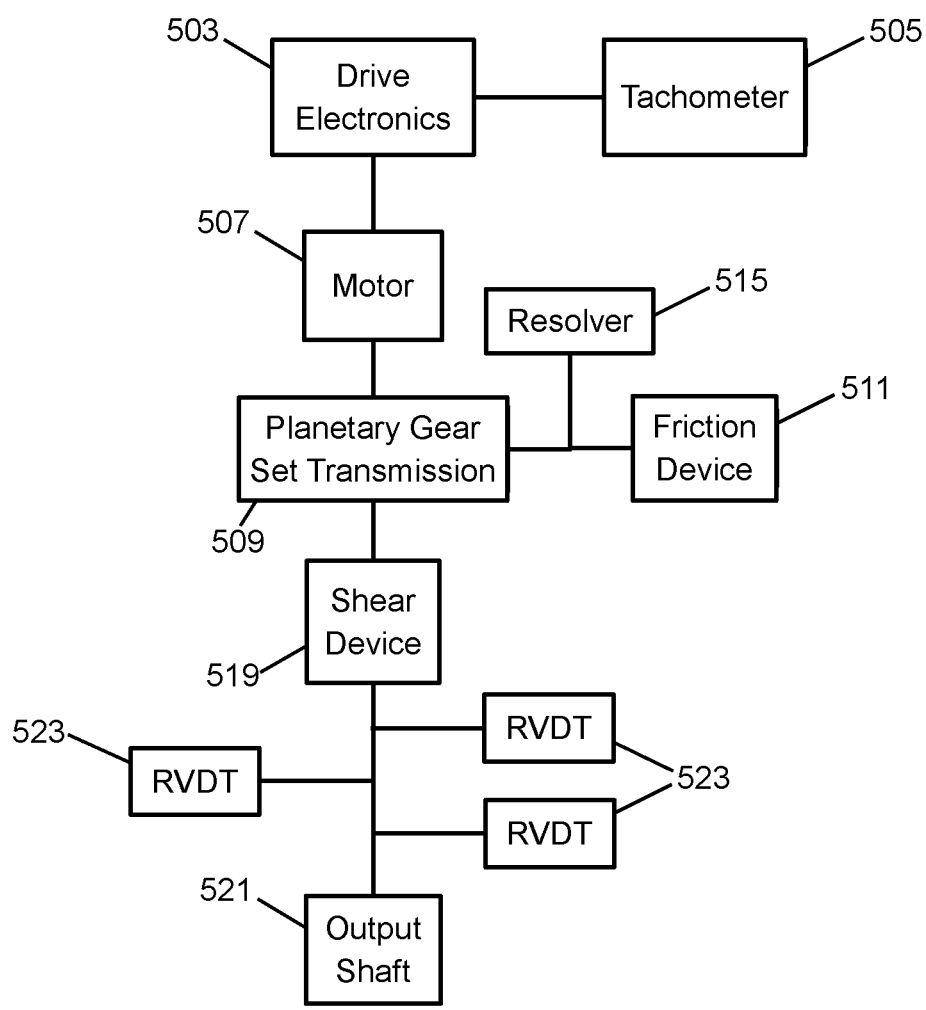
FIG. 5 is a diagram illustrating a collective trim assembly that may be used to provide variable friction and gradient force tactile cues through the pilot controls according to some embodiments.

FIG. 5 is a diagram illustrating a collective trim assembly 501 that may be used to provide variable friction and gradient force tactile cues through the pilot controls according to some embodiments. The collective trim assembly 501 may have an output shaft 521 that drives the collective control assembly to move the collective stick and that receives movement from the collective stick. The collective trim assembly 501 has one or more tactile cue elements that provide the tactile cues and that may include a motor 507 and one or more friction devices 511 controlled by drive electronics 503. The tactile cue elements control action of a connected pilot control, to provide tactile cues through the motion, feel, resistance, or the like, of the pilot control. The drive electronics 503 may receive, from the FCCs, or from another element in the FBW system, a signal indicating how the tactile cue elements should perform in order to control the collective stick. For example, the FCCs may send the drive electronics 503 a force cue control signal indicating a position to which the motor 507 should set the collective stick and/or the force that should be used to move the collective stick. The FCCs may also send a friction cue control signal to the drive electronics 503 indicating that the friction device 511 should engage to provide the friction cue. The friction cue control signal may further indicate the resistive force to be applied by the friction device 511.

The motor 507 is connected to a transmission such as a planetary gear set transmission 509, electric clutch, or the like, which is turn, connected to the output shaft 521 through a shear device 519. The motor 507 provides a drive or force similar to a spring force on the collective stick, mimicking the feel of a mechanical spring while the collective stick is mechanically disconnected from the swashplate and engines. Additionally, the friction device 511 provides resistance to movement of the output shaft 521 and collective stick, mimicking the feel of a mechanical system.

In some embodiments, the friction device 511 is an electromechanical device that resists motion of the collective stick through gearing in the planetary gear set according to a current passed through the friction device 511. In some embodiments, multiple friction devices 511 may be provided in a single element, with individual FCCs controlling different friction devices 511. The drive electronics 503 may receive a command to provide the friction cue, and may pass a current to the friction device 511 to generate the specified friction, or command the friction device 511 to use a current that will provide the specified friction. In some embodiments, a friction device 511 is a conductive coil that creates a magnetic field when current passes through the coil. The induced magnetic field provides a resistance to turning of a shaft or core in the coil. The friction device 511 may be disposed on a shaft or axle of one or more elements of the planetary gear set transmission 509 so that pilot inputs through the pilot controls are transmitted through the planetary gear set transmission 509 to the friction device 511. Movement of the pilot controls turn or move the axle within the friction device coil, and the resistance provided by the magnetic field of the friction device coil is felt as a friction cue in the pilot control. The FCCs can vary the friction provided by the friction device 511 by varying the current passing through the friction device coils, creating a stronger or weaker magnetic field, and greater or lesser resistance to turning of the axle.

The planetary gear set transmission 509 is a variable coupling that permits the motor 507 to drive the output shaft 521, but allows inputs through the output shaft 521 to override the drive by the motor 507. Thus, if the collective stick is moved or controlled by the pilot in a way that is contrary to the drive of the motor 507, the pilot's inputs overcome the force applied by the motor 507. Additionally, inputs from the pilot controls through the output shaft 521 drive the planetary gear set transmission 509 and friction device 511 so that friction created by the friction device 511 is felt by the pilot when the pilot moves the collective stick. One or more resolvers 515 may be connected between the planetary gear set transmission 509 and the friction device 511 and may act as detent sensors to determine fine motion of the collective stick indicating whether the pilot is controlling the collective stick. The resolver 515 may provide a collective detent signal indicating control or motion of the collective stick by the pilot.

The shear device 519 is a coupling allowing the collective stick to separate from the planetary gear set transmission 509 and motor 507. For example, should the transmission 509 become jammed, or the motor 507 malfunction, the shear device 519 can be broken so that the collective stick may be moved and used without being impeded by the inoperable transmission or motor 507.

In some embodiments, position sensors such as rotary variable differential transformers (RVDTs) 523 determine the rotation of the output shaft 521 and generate position signals indicating the position of the collective stick. The RVDTs 523 are disposed between the shear device 519 and the output shaft 521 so that the position of the output shaft 521 can be determined even if the shear device 519 has been broken or sheared, allowing pilot control of the rotorcraft even if the motor 507 or planetary gear set transmission 509, or other parts of the drive system are inoperable. In some embodiments, multiple RVDTs 523 are used to separately measure the position of the output shaft 521 for redundancy. Each FCC may be connected to a different RVDT 523 so that each FCC independently determines a position of the output shaft 521, and any disagreement between readings from different RVDTs 523 can be identified and handled.

In some embodiments, the friction devices 501 may be activated or deactivated according to the detent state of the connected control elements. For example, the friction devices 501 may engage when the pilot is in control of the control element and the control element is OOD. Similarly, the friction devices 501 may disengage when the pilot has released the control element and the control is ID. Thus, the friction devices 501 may be controlled so that the trim motor does not drive the controls solely when the friction devices 501 are engaged. In other embodiments, the friction devices 501 may be connected to a transmission that decouples the friction devices 501 from the trim motor, by separated gearing, by one or more clutches, or the like.

Figure 6:
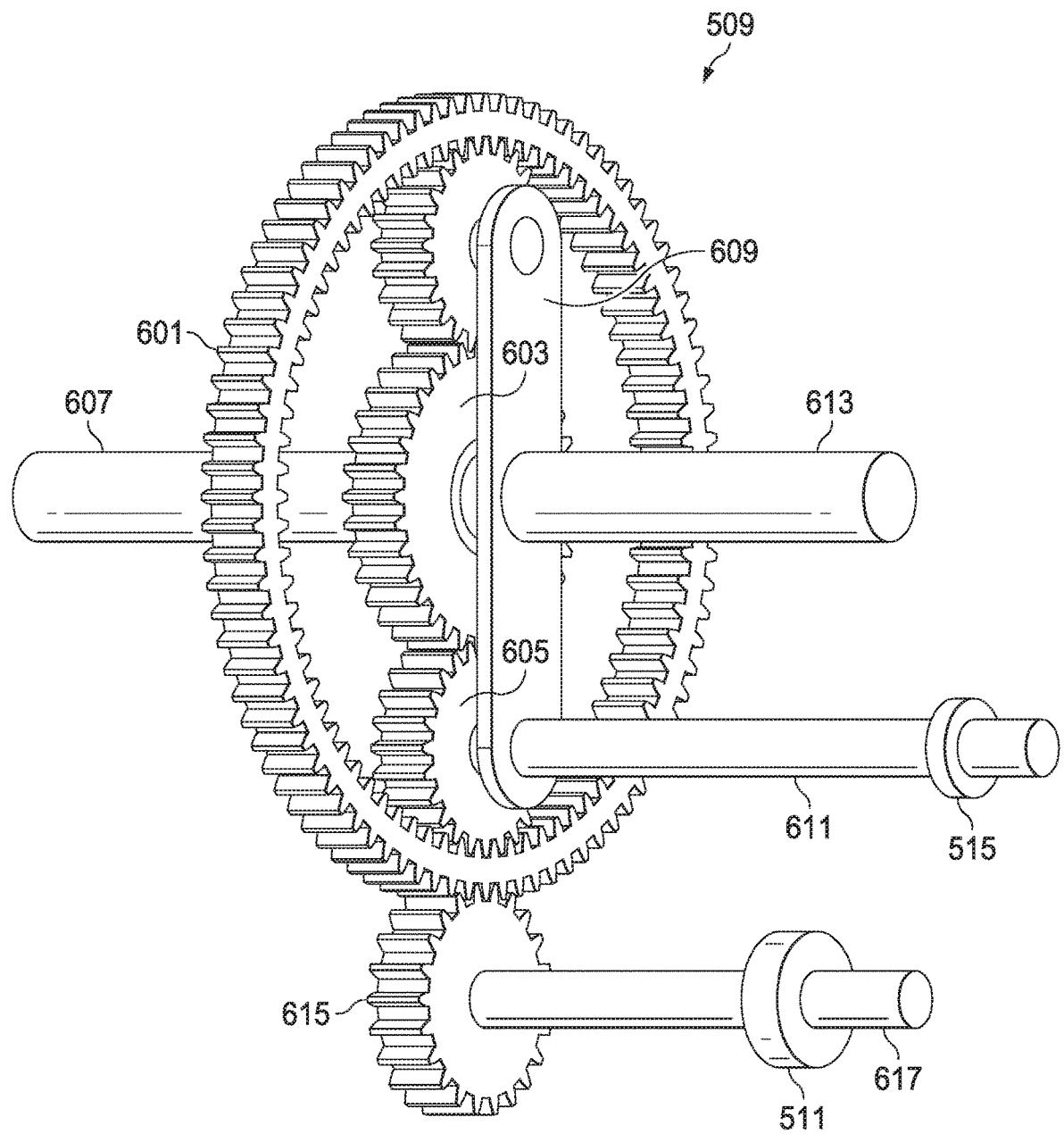
FIG. 6 is a diagram illustrating a planetary gear set for providing variable friction and gradient force tactile cues through the pilot controls according to some embodiments.

FIG. 6 is a diagram illustrating a planetary gear set 601 for providing variable friction and gradient force tactile cues through the pilot controls according to some embodiments. The planetary gear set has a central sun gear 603 connected to sun shaft 607. Planet gears 605 are mounted on a carrier 609, and are held between the sun gear 603 and a ring gear 601 by the carrier 609. In some embodiments, the trim motor drives the sun gear 603, and the pilot controls are connected to, and drive, the ring gear 601. The friction device 511 may be connected to a spur axle 617 having a spur gear 615 that meshes with the ring gear 601. In other embodiments, the friction device 511 may be disposed on the planet axle 611, or be connected to the pilot controls through another portion of the planetary gear set 509. Additionally, the resolver 511 may, in some embodiments, be disposed on a planet axle 611. In some embodiments, the spur gear 615 is outside the ring gear 601 and meshes with just the ring gear 601. Thus, rotation of the ring gear 601 as a result of movement of the pilot controls will result in the planet gears 605 turning, driving spur gear 615 and the friction device 511. movement of the pilot controls. The friction device 511 provides friction, or a resistance to turning, on the spur axle 617, which is felt as the friction cue in the pilot controls.

The trim motor drives the sun gear 603 to provide the force cue. The sun gear 603, in turn, drives the planet gears 605, which drive the ring gear 601, moving the pilot controls. In some embodiments, when the trim motor drives the sun gear 603, the carrier 609 rotates with the sun gear 603, causing the planet gears 605 to drive the ring gear 601. The friction device 511, when engaged, may have friction sufficient to prevent the trim motor from driving the spur gear, so that the trim motor avoids driving the fiction device. In other embodiments, the friction device 511 may disengage from the spur shaft 617 when the trim motor drives the pilot controls.

In some embodiments, the friction devices 511 may be activated or deactivated according to the detent state of the connected control elements. For example, the friction devices 511 may engage when the pilot is in control of the control element and the control element is OOD. Similarly, the friction devices 511 may disengage when the pilot has released the control element and the control is ID. Thus, the friction devices 511 may be controlled so that the trim motor does not drive the controls solely when the friction devices 511 are engaged. In other embodiments, the friction devices 511 may be connected to a transmission that decouples the friction devices 511 from the trim motor, by separated gearing, by one or more clutches, or the like.

In some embodiments, the planetary gear set 509 may have multiple planet gear levels or ring gears 601. The sun gear 603 may drive the ring gear 601 through a first set of planet gears 605 without a friction device 511, while the ring gear 601 drives a second set of planet gears 605 with the friction devices 511, avoiding the need for the sun gear 603 to drive gears connected to the friction device 511. In yet other embodiments, the trim motor drives the sun gear 603, the pilot controls are connected to a carrier shaft 613 and control the carrier 609, and the friction devices 511 provide resistance to the ring gear 601 rotation.

FIG. 7 is a diagram 701 illustrating various embodiments of variable friction profiles for providing tactile cues. The example profiles illustrate embodiments of force cue (solid lines) and friction cue (dotted lines) profiles that may be used for providing tactile cues at a collective stick based on engine limits with a threshold 703 and maximum setting 705. In a first cueing profile 707, a first force profile has a baseline force cue portion 709 where the collective stick position is below the threshold 703 and the force provided to the collective stick is not enabled. At the threshold 703, the first force profile has a force step change 713 in the force provided to the collective stick indicating that the trim motor has turned on, and is driving the collective stick back to the threshold 703. The force step change 713 provides a soft stop by rapidly ramping the force on the collective stick so that a pilot readily recognizes the engagement of the force cue. Above the threshold 703, the first force profile has a gradient force portion 721 where the force is increased according to the deviation of the collective stick from the threshold 703. The first cueing profile 707 may also have a first friction profile with a baseline friction cue portion 711 below the threshold 703, a friction step change 715 at the threshold, and a gradient friction portion 719 above the threshold. In some embodiments, the gradient friction portion 719 is a friction that is applied to movement of the collective stick above the engine limit represented by the threshold 703 and that increases according to deviation of the collective stick position from the threshold 703.

In a second cueing profile 723, a second friction profile may have a baseline friction portion 727 extending to a first point 731 that is below the threshold 703 by a predetermined range or collective position distance. At the first point 731, the second friction profile may have a friction step change 725 that is at a different collective position from the force step change 713, and that provides a transition to a friction gradient portion 729.

In a third cueing profile 743, a third friction profile may have a baseline friction portion 745 that is non-zero to provide friction during normal use of the collective stick. The baseline friction portion 745 may extend to a second point that may be at, or different from the threshold 703. In some embodiments, the second friction profile may transition to a friction gradient portion 729 at the second point 747, but in other embodiments, may have a friction step change or the like.

In a fourth cueing profile 753, a fourth friction profile may have a baseline friction portion 755 extending to a third point 757 that may be at, or different from the threshold 703. At the third point 757, the fourth friction profile may have an active friction cue portion 759 where the friction provided to the collective stick is increased non-linearly, and with or without a friction step change transition between the baseline friction portion 755 and the active friction cue portion 759.

FIG. 8 is a diagram 801 illustrating various embodiments of gradient force profiles for providing tactile cues. The example profiles illustrate embodiments of force cue (solid lines) and friction cue (dotted lines) profiles that may be used for providing tactile cues at a collective stick based on engine limits with a threshold 803 and maximum setting 805. In a fifth cueing profile 807, a fifth friction profile has a baseline friction cue portion 811 below the threshold 803, which corresponds to the collective stick being below the threshold 803, and no friction being applied, or a baseline, constant or initial friction cue being applied to simulate friction of a mechanical control system. The fifth friction profile has a friction step change 815 at the threshold, and a gradient friction portion 819 above the threshold 803.

The fifth cueing profile 807 has a second force profile with a baseline force portion 809 where the force cue is not engaged or is provided at a constants initial level. In an embodiment, the second force profile may have multiple step changes 813 and 823 and multiple gradient force portions 821 and 825, which may be used to indicated multiple stops or thresholds, different levels of severity for a warning condition, or the like. For example, a first force step change 813 may be at the threshold 803 and may be used to transition between the baseline force portion 809 and a first gradient force portion 821. A second force step change 823 may be used to transition between the first gradient force portion 821 and a second gradient force portion 825. The second force step change 823 may be different from the threshold 803 and the maximum setting, and may be used to indicate a second threshold engine limit, or the like. For example, the first force step change 813 may indicate that the collective stick has been pulled past a maximum continuous power limit, and the second force step change 823 may indicate that the collective stick has been pulled past another limit such as a maximum continuous takeoff power limit. Additionally, the first gradient force portion 821 may have a different slope from the second gradient force portion 825, with the second gradient force portion 825 having a force that increases more rapidly than the first gradient force portion 821 to emphasis the different cue regimes.

In a sixth cueing profile 829, a third force profile may have a baseline force portion 809 extending to a first point 833 that is below the threshold 803 by a predetermined range or collective position distance. At the first point 833, the third force profile may have a force step change 831 that is at a different collective position from the friction step change 815, and that provides a transition to a gradient force portion 835.

In a seventh cueing profile 837, a fourth force profile may have a first gradient force portion 839 separate from the threshold 803. The first gradient force portion 839 may transition, at a fifth point 841, to a baseline force portion 843 that is non-zero and may provide a force cue during normal use of the collective stick. Thus, the first gradient force portion 839 and baseline force portion 843 may provide a force to drive the collective stick downward to a lowest setting, or to drive the collective stick upward to, for example, a predetermined trim position for the collective stick such as position corresponding to a held vertical speed. Additionally, the fourth force profile may have a force step change 831 separate from the threshold 803 and transitioning to a second gradient force portion 835.

In a fourth cueing profile 847, a fifth force profile may have a baseline force portion 809 extending to a sixth point 849 that may be at, or different from the threshold 803. At the sixth point 849, the fifth force profile may have an active force cue portion 851 where the force provided to the collective stick is increased non-linearly, and with or without a force step change transition between the baseline force portion 809 and the active force cue portion 851.

From the foregoing example, it can be seen that the force profile and friction profile are not limited to being the same, aligning with a threshold, being linear, or having only one step change. A tactile cue may be provided through just the force cue, just the friction cue, or a combination of the force cue and friction cue, and the force cue and friction cue may be customized with gradients, step changes, and the like to provide customized action, feel movement, force or handling of a pilot control.

Figure 9:
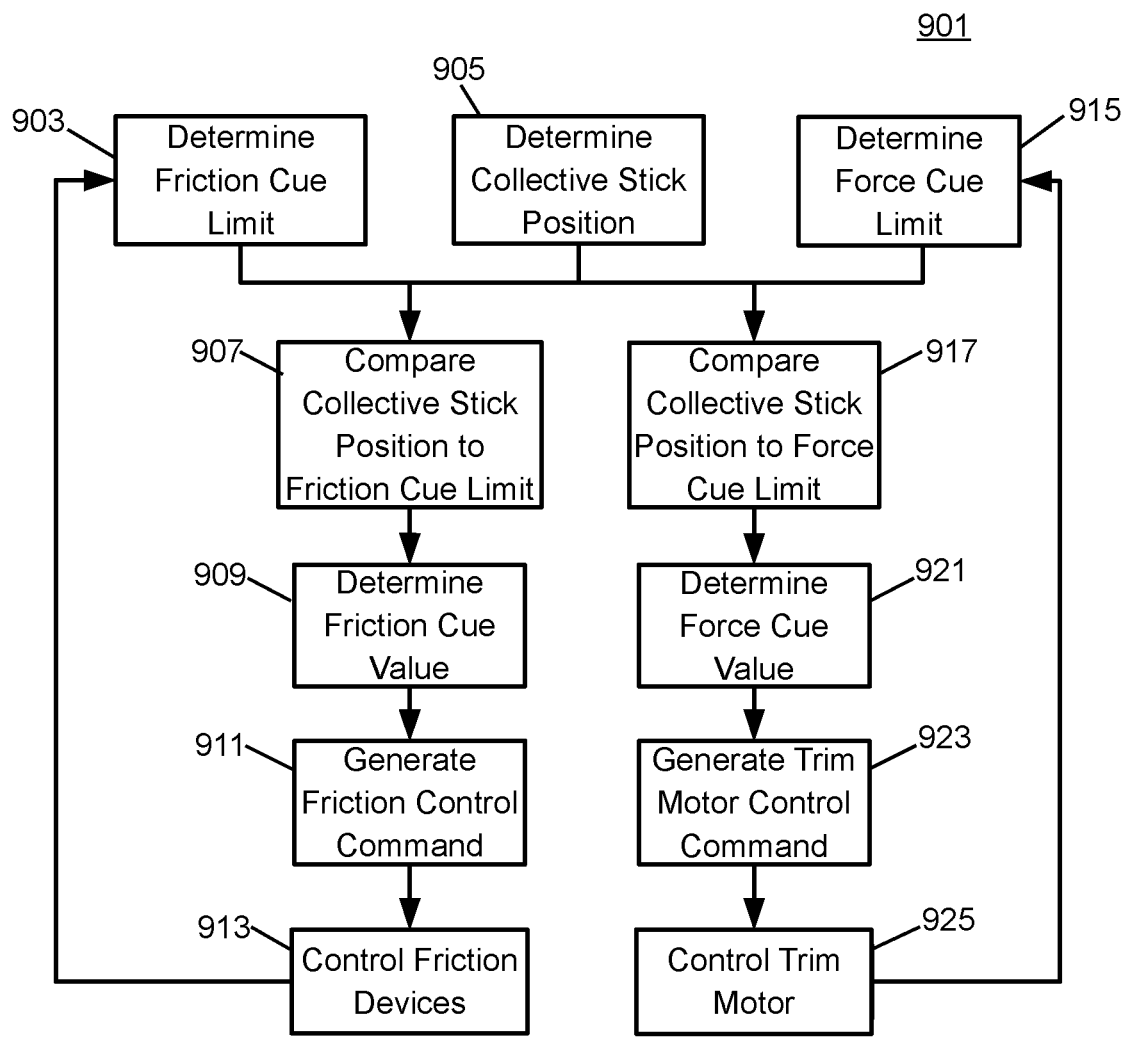
FIG. 9 is a flow diagram illustrating a method for providing variable friction and gradient force tactile cues through the pilot controls according to some embodiments.

FIG. 9 is a flow diagram illustrating a method 901 for providing variable friction and gradient force tactile cues through the pilot controls according to some embodiments. The FCCs may continuously monitor the collective stick position, and in block 905 may determine a collective stick position at a particular monitor time. The FCCs may also determine a friction cue limit in block 903. Similarly, in block 915, the FCCs may determine a force cue limit. The FCCs may, for example, determine an operating parameter such as a flight mode, engine limit being applied, and any other monitored parameter, and determine one or more associated cue limits. In some embodiments, the tactile cues may be intended for the collective stick and the FCCs may determine a force cue limit and a friction cue limit for flight parameters associated with the collective stick. For example, the collective setting in a FBW system is associated with engine power, and is controlled by the collective stick. The FCC may determine the force cue limit or the friction cue limit from performance limits or operating limits associated with the engine limits, such as engine power or the collective setting. In some embodiments, the friction cue limit and the force cue limit are the same, indicating that both a force cue and a friction cue should be engaged at the same point. For example, the FCCs may monitor an engine limit with respect to a collective stick position and determine that a force cue and a friction cue should be applied or engaged at a collective stick position corresponding to a maximum continuous power limit. In other embodiments, the force cue limit and the friction cue limit may be different. For example, in an embodiments where the force cue or the friction cue are engaged before the threshold, the respective cue limit may be based on, but offset from, the associated performance limit or operating limits.

In block 907, the FCCs compare the collective stick position to the friction cue limit, and in block 917, the FCCs compare the collective stick position to the force cue limit. In embodiments where the friction cue limit is the same as the force cue limit, the FCCs may make a single comparison between the collective stick position and the combination of the force cue limit/friction cue limit. In some embodiments, the FCCs determine whether to engage or disengage the friction cue and/or the force cue according to a relationship between the collective stick position and one or both of the friction cue limit and the force cue limit. For example, the FCCs may determine whether the collective stick position exceeds the friction cue limit or force cue limit directly, or may determine whether the force cue limit or friction cue limit is within a predetermined range of the friction cue limit or force cue limit, and engage the friction cue of force cue in response to the determination. In some embodiments, the FCCs may also determine that the collective stick position is outside of the threshold or has moved from exceeding the threshold to outside of the threshold, and may determine to terminate the tactile cue.

In block 909, the FCCs may determine a friction cue value and, in block 921, the FCCs may determine the force cue value. In some embodiments, the cue values are determined according to a pilot control position and the limit. The FCCs may determine the difference between the pilot control position and the limit, and then determine the cue values according to the difference or according to a ratio of the difference to a range of movement for the relevant pilot control that is available past the limit.

For example, where FCCs monitor an engine limit, the FCCs may determine that a maximum continuous power limit correlated to a collective stick position that is 10 inches above the low position. Thus, the FCCs may determine that the high position is 10 inches above the low position, and that the normal operating range lies between the low position and high position. Thus, the overdrive range may be above the high position, and the collective stick may have, for example, a 5 inch range of motion above the high position and in the overdrive range. In an embodiment, the FCCs may determine that the friction cue limit and the force cue limit are at the engine limit, which is correlated with the high position of the collective stick. The FCCs may then monitor to the collective stick position, and compare it to the cue limits. When the FCCs determine that the collective stick position is above the high position or cue limit, the FCCs may determine to apply the friction cue and force cue. The FCCs then determine the force cue value and friction cue value. The force cue value may be set to an initial or step change force, such as 1.8 pounds, which is applied for all positions past the threshold. Additionally, the FCCs may also determine that the collective stick has an overdrive distance of is 2 inches due to being 2 inches past the threshold, and apply an additional gradient force based on the overdrive distance. For example, the FCCs may determine that a 0.3 pound per inch force should be applied, resulting in a 2.4 pound force cue (1.8 lb step change force+(0.3 lb/inch gradient*2 inches)). In another embodiment, the FCCs may determine the force cue according to a ratio of the overdrive distance to the range of movement overdrive range. For example, the FCCs may determine that a total desirable force cue, or a maximum force cue value, is 6.8 pounds, with 1.8 pounds being applied as an initial force or step change. Thus, the maximum gradient force is 5 pounds, which is applied over a 5 inch range. Therefore, for a 2 inch overdrive range, a 2 pound gradient force may be used, resulting in a 3.8 pound force cue. The value of the friction cue may be similarly determined, and maybe determined independently of the force cue, or based on the force cue. In some embodiments, the force cue may be modified based on the friction cue to, for example, compensate for friction that may interfere with the force cue provided by the trim motor. Additionally, in some embodiments, the cues may be zeroed out, negated, or set to a default or minimum value in response to the FCCs determining that the collective stick position is outside of the limit or has ceased exceeding the limit so that the tactile cue is disengaged or not enabled.

In block 911 the FCCs generate the friction control command according to the friction cue value, and in block 923 the FCCs generate the trim motor control command according to the force cue value. The friction control command and trim motor control command may be signals indicating the respective friction cue value of force cue value, or may otherwise indicated to the trim assembly how to generate the required friction or force. In block 913 the trim assembly controls the friction devices according to the friction control command, and in block the trim assembly controls the trim motor according to the trim motor control command to provide the tactile cues through the collective stick according to the determined cue values.

While the method 901 disclosed herein has been described in terms of discrete blocks, it should be understood that the method is not limited to the disclosed order of blocks. The FCCs continuously monitor the control positions and control limits to set, adjust, or terminate the tactile cueing at the pilot controls. In some embodiments, for example, the FCCSs may continuously monitor the position of the collective stick, compare the position to tactile cue limits, determine the tactile cue values and control the tactile cue elements so that the tactile cues are turned on and off as the collective stick position exceeds, and falls below, the relevant thresholds.

An embodiment rotorcraft includes a pilot control, a pilot control position sensor connected to the pilot control, where the pilot control position sensor is operable to generate a position signal indicating a position of the pilot control, a flight control computer (FCC) in signal communication with the pilot control position sensor and operable to provide a tactile cue in the pilot control in response to the position signal indicating the position of the pilot control has exceeded a threshold associated with an operating limit, where the FCC is further operable to determine a tactile cueing value for the tactile cue according to a relationship between the position of the pilot control and the threshold, and generate a cue control signal according to the tactile cueing value, and a tactile cue element connected to the pilot control and in signal communication with the FCC, where the tactile cue element is operable to control action of the pilot control in response to the cue control signal.

In some embodiments, the tactile cue value is a magnitude of the tactile cue. In some embodiments, the tactile cue is a variable friction cue and the tactile cue element is operable to control action of the pilot control to implement the variable friction cue by providing a force that is resistant to movement of the pilot control. In some embodiments, the tactile cue is a gradient force cue and the tactile cue element is operable to control action of the pilot control to implement the gradient force cue by providing a force on the pilot control that pushes the pilot control toward the threshold. In some embodiments, the tactile cue is at least one of a variable friction cue and a gradient force cue. In some embodiments, the FCC is operable determine a friction cue limit and a force cue limit according to the operating limit, the FCC is further operable to determine a friction cueing value according to a relationship between the position of the pilot control and the friction cue limit and generate a friction cue control signal according to the friction cueing value, the FCC is further operable to determine a force cueing value according to the relationship between the position of the pilot control and the force cue limit and generate a force cue control signal in response to the according to the force cueing value, the tactile cue element is further operable to provide a first force that is resistant to movement of the pilot control according to the friction cue control signal, and the tactile cue element is further operable to provide a second force on the pilot control in a direction of the threshold according to the force cue control signal. In some embodiments, the tactile cue element includes a friction device connected to the pilot control and configured to provide the first force, the friction device includes a coil that provides the first force in response to a current through the coil, and the tactile cue element further includes a trim motor connected to the pilot control and configured to provide the second force. In some embodiments, the tactile cue element includes a planetary gear set transmission connecting the friction device and the trim motor to the pilot control.

An embodiment flight control computer (FCC) for a rotorcraft includes a processor and a non-transitory computer-readable storage medium storing a program to be executed by the processor. The program includes instructions for providing a tactile cue, and the instructions for providing the tactile cue include instructions for receiving a position signal indicating a position of a collective control of the rotorcraft, determining one or more cue limits according to one or more operating limits of the rotorcraft, determining to apply the tactile cue according to a relationship between the one or more cue limits and the position of the collective control, and controlling action of the collective control in response to determining to apply the tactile cue and using a magnitude of the tactile cue determined according to the relationship between the one or more cue limits and the position of the collective control.

In some embodiments, the instructions for providing the tactile cue further include instructions for determining the magnitude of the tactile cue according to the relationship between the one or more cue limits and the position of the collective control. In some embodiments, the instructions for determining the magnitude of the tactile cue include instructions for using a sum of a predetermined step change cue value and a gradient cue value as the a magnitude of the tactile cue, where the predetermined step change cue value is a constant, and where the gradient cue value is determined according to a distance which the position of the collective control exceeds at least one of the one or more cue limits. In some embodiments, the one or more operating limits include an engine limit selected from a plurality of engine power settings. In some embodiments, the instructions for determining the one or more cue limits include instructions for determining a friction cue limit and a force cue limit according to the one or more operating limits, the instructions for determining the magnitude of the tactile cue include instructions for determining a friction cueing value according to a relationship between the position of the collective control and the friction cue limit, the instructions for determining the magnitude of the tactile cue further include instructions for determining a force cueing value according to the relationship between the position of the collective control and the force cue limit, and the instructions for controlling action of the collective control include instructions for controlling action of the collective control in response to determining to apply the tactile cue and according to the friction cueing value and the force cueing value. In some embodiments, the friction cue limit is different from the force cue limit.

An embodiment method for operating a rotorcraft includes providing a tactile cue on a collective control of the rotorcraft. Providing the tactile cue on the collective control includes receiving a position signal indicating a position of the collective control, determining one or more cue limits according to one or more operating limits of the rotorcraft, determining to apply the tactile cue according to a relationship between the one or more cue limits and the position of the collective control, determining one or more tactile cue values for the tactile cue in response to determining to apply the tactile cue and according to the relationship between the one or more cue limits and the position of the collective control, and controlling action of the collective control in response to determining to apply the tactile cue and using the tactile cue values.

In some embodiments, each of the one or more tactile cue values are a magnitude of the tactile cue. In some embodiments, the determining the one or more tactile cue values includes determining the one or more tactile cue values using a sum of a predetermined step change cue value and a gradient cue value as the magnitude of the tactile cue, where the predetermined step change cue value is a constant, and where the gradient cue value is determined according to a distance which the position of the collective control exceeds at least one of the one or more cue limits. In some embodiments, the one or more operating limits include an engine limit selected from a plurality of engine power settings. In some embodiments, the tactile cue is at least one of a variable friction cue and a gradient force cue, the controlling the action of the collective control includes providing the at least one of the variable friction cue and the gradient force cue through the collective control, providing the variable friction cue includes providing a first force that is resistant to movement of the collective control, and providing the gradient force cue includes providing a second force on the collective control that pushed the collective control toward at least one of the one or more cue limits. In some embodiments, the providing the variable friction cue includes providing a current to a coil that provides the variable friction cue in response to the current through the coil, and the providing the gradient force cue includes providing a command related to a drive of a trim motor that is connected to the collective control.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
 a pilot collective control;
 a pilot control position sensor connected to the pilot collective control, wherein the pilot control position sensor is operable to generate a position signal indicating a position of the pilot collective control;
 a flight control computer (FCC) in signal communication with the pilot control position sensor and operable to provide tactile cues in the pilot collective control in response to the position signal indicating the position of the pilot collective control has exceeded a threshold associated with an operating limit, wherein the tactile cues comprise a friction cue and a force cue, wherein the FCC is further operable to determine tactile cueing values for the tactile cues according to a relationship between the position of the pilot collective control and the threshold, and generate cue control signals according to the tactile cueing values; and
 tactile cue elements connected to the pilot collective control and in signal communication with the FCC, wherein the tactile cue elements are operable to control action of the pilot collective control in response to the cue control signals;
 wherein the tactile cue elements comprise a friction device connected to a variable coupling disposed between the friction device and the pilot collective control, and wherein the friction device provides the friction cue through the variable coupling to the pilot collective control in response to the cue control signals;
 wherein the tactile cue elements further comprise a trim motor connected to the variable coupling separately from the friction device, wherein the variable coupling is disposed between the pilot collective control and the trim motor, and wherein the trim motor provides the force cue, separate from the friction cue, through the variable coupling to the pilot collective control in response to the cue control signals.

2. The rotorcraft of claim 1, wherein the tactile cueing values are magnitudes of the tactile cues.

3. The rotorcraft of claim 2, wherein the friction cue is a variable friction cue and wherein the friction device is operable to control action of the pilot collective control to implement the variable friction cue by providing a force that is resistant to movement of the pilot collective control.

4. The rotorcraft of claim 2, wherein the force cue is a gradient force cue and wherein the trim motor is operable to control action of the pilot collective control to implement the gradient force cue by providing a force on the pilot collective control that pushes the pilot collective control toward the threshold.

5. The rotorcraft of claim 1, wherein the friction cue is a variable friction cue and wherein the force cue is a gradient force cue.

6. The rotorcraft of claim 5, wherein the FCC is operable determine a friction cue limit and a force cue limit according to the operating limit;
   wherein the FCC is further operable to determine a friction cueing value according to a relationship between the position of the pilot collective control and the friction cue limit and generate a friction cue control signal according to the friction cueing value;
   wherein the FCC being operable to determine the tactile cueing values comprises the FCC being operable to determine a force cueing value according to the relationship between the position of the pilot collective control and the force cue limit and further operable to generate a force cue control signal according to the force cueing value;
   wherein the friction device is further operable to provide the friction cue, which is resistant to movement of the pilot collective control, according to the friction cue control signal; and
   wherein the trim motor is further operable to provide the force cue on the pilot collective control in a direction of the threshold according to the force cue control signal.

7. The rotorcraft of claim 1, wherein the variable coupling is a planetary gear set transmission connecting the friction device and the trim motor to the pilot collective control.

8. A flight control computer (FCC) for a rotorcraft, comprising:
   a processor; and
   a non-transitory computer-readable storage medium storing a program to be executed by the processor, the program including instructions for providing tactile cues, the instructions for providing the tactile cues including instructions for:
      receiving a position signal indicating a position of a collective control of the rotorcraft;
      determining cue limits according to one or more operating limits of the rotorcraft, wherein the cue limits comprise a friction cue limit and a force cue limit;
      determining to apply the tactile cues according to a relationship between the respective cue limits and the position of the collective control; and
      controlling action of the collective control in response to determining to apply the tactile cues and using a magnitude of the tactile cues determined according to the relationship between the respective cue limits and the position of the collective control;
   wherein the instructions for controlling the action of the collective control include instructions for controlling, according to the friction cue limit, a friction device connected to a variable coupling disposed between the friction device and the collective control, wherein the controlling the friction device provides a friction cue through the variable coupling to the collective control;
   wherein the instructions for controlling the action of the collective control further include instructions for controlling, according to the force cue limit and separately from controlling the friction device, a trim motor connected to the variable coupling separately from the friction device, wherein the variable coupling is disposed between the collective control and the trim motor, wherein the controlling the trim motor provides a force cue, separate from the friction cue, through the variable coupling to the collective control.

9. The FCC of claim 8, wherein the instructions for determining the magnitude of the tactile cues include instructions for:
   using a sum of a predetermined step change cueing value and a gradient cue value as the magnitude of the respective tactile cues, wherein the predetermined step change cueing value is a constant, and wherein the gradient cue value is determined according to a distance which the position of the collective control exceeds the respective cue limits.

10. The FCC of claim 8, wherein the one or more operating limits include an engine limit selected from a plurality of engine power settings.

11. The FCC of claim 10, wherein the instructions for determining the cue limits include instructions for determining the friction cue limit and the force cue limit according to the one or more operating limits;
   wherein the instructions for determining the magnitude of the tactile cues include instructions for determining a friction cueing value associated with the friction cue according to a relationship between the position of the collective control and the friction cue limit; and
   wherein the instructions for determining the magnitude of the tactile cues further include instructions for determining a force cueing value associated with the force cue according to the relationship between the position of the collective control and the force cue limit.

12. The FCC of claim 11, wherein the friction cue limit is different from the force cue limit.

13. A method for operating a rotorcraft, comprising:
   providing tactile cues on a collective control of the rotorcraft by performing:
      receiving a position signal indicating a position of the collective control;
      determining cue limits according to one or more operating limits of the rotorcraft, wherein the cue limits comprise a friction cue limit and a force cue limit;
      determining to apply the tactile cues according to a relationship between the cue limits and the position of the collective control;
      determining tactile cue values for the tactile cues in response to determining to apply the tactile cues and according to the relationship between the respective cue limits and the position of the collective control, wherein a magnitudes of the tactile cues comprises the tactile cue values; and
      controlling action of the collective control in response to determining to apply the tactile cue and using the tactile cue values;
   wherein the controlling the action of the collective control includes controlling, according to the friction cue limit, a friction device connected to a variable coupling disposed between the friction device and the collective control, wherein the controlling the friction device provides a friction cue through the variable coupling to the collective control;
   wherein the controlling the action of the collective control further includes controlling, according to the force cue limit and separately from controlling the friction device, a trim motor connected to the variable coupling separately from the friction device, wherein the variable coupling is disposed between the collective control and the trim motor, wherein the controlling the trim motor provides a force cue, separate from the friction cue, through the variable coupling to the collective control.

14. The method of claim 13, wherein the determining the tactile cue values includes determining the tactile cue values using a sum of a predetermined step change cueing value and a gradient cueing value as the magnitude of the tactile cue, wherein the predetermined step change cueing value is a constant.

15. The method of claim 14, wherein the one or more operating limits include an engine limit selected from a plurality of engine power settings.

16. The method of claim 13, wherein the friction cue is a variable friction cue and wherein the force cue is a gradient force cue;
   wherein the controlling the action of the collective control includes providing the at least one of the variable friction cue and the gradient force cue through the collective control;
   wherein providing the variable friction cue includes providing a first force that is resistant to movement of the collective control; and
   wherein providing the gradient force cue includes providing a second force on the collective control that pushes the collective control toward at least one of cue limits.

17. The method of claim 16, wherein the providing the variable friction cue includes providing a current to a coil of the friction device that provides the variable friction cue in response to the current through the coil; and
   wherein the providing the gradient force cue includes providing a command related to a drive of the trim motor.

* * * * *